E. D. Barrett,

Steam Slide Valve.

No. 2,060. Reissued Aug. 29, 1865.

Inventors:

Edw. D. Barrett

A. B. Bigelow

Attorneys a. Pitts Atty

Witnesses:

E. Heaton

Rufus H. Sanford

John E. Earle

UNITED STATES PATENT OFFICE.

EDWARD D. BARRETT AND H. B. BIGELOW, OF NEW HAVEN, CONNECTICUT, ASSIGNEES OF E. D. BARRETT.

IMPROVEMENT IN STEAM-ENGINES.

Specification forming part of Letters Patent No. 19,119, dated January 19, 1858; Reissue No. 2,060, dated August 29, 1865.

*To all whom it may concern:*

Be it known that I, EDWD. D. BARRETT, (formerly of Cincinnati, Ohio,) of New Haven, in the county of New Haven and State of Connecticut, have invented a new and useful Improvement in Steam-Engines; and I do hereby declare the following to be a full, clear, and exact description of the same, when taken in connection with the accompanying drawings and the letters of reference marked thereon, and which said drawings constitute part of this specification, and represent, in—

Figure 1:
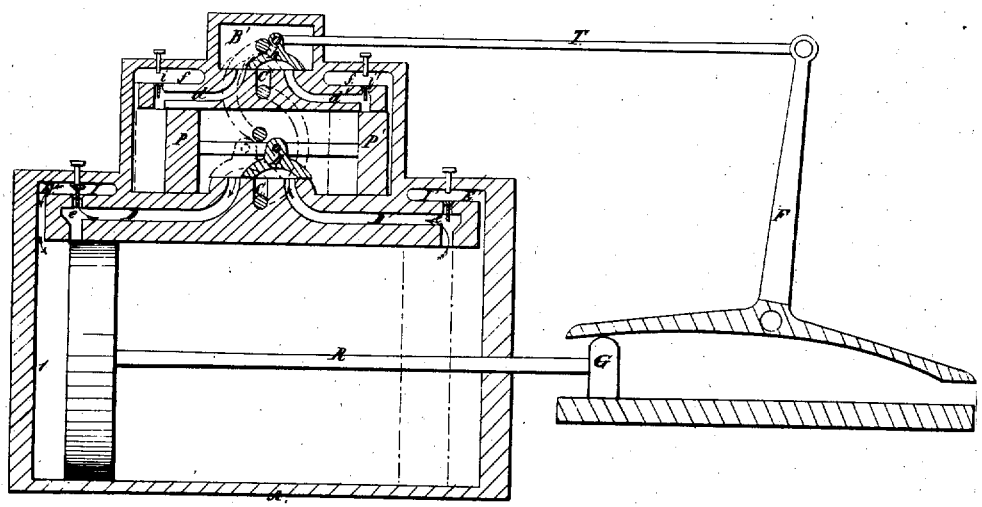
Figure 2:
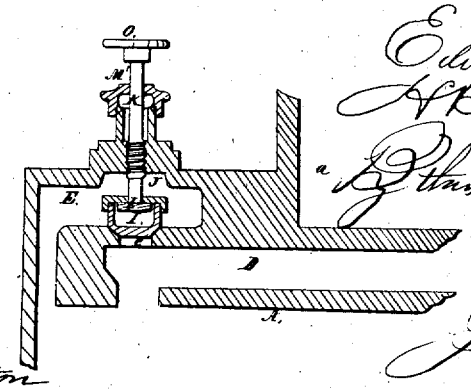

Figure 1, an axial section through the cylinder and valve-chambers, and in Fig. 2 the auxiliary port and valve enlarged.

Similar letters indicate corresponding parts.

My invention is designed to operate the valve of steam-cylinder, to reverse the piston, and avoid the necessary use of a crank or its equivalent; and my invention consists in the arrangement of two connected pistons within a cylinder auxiliary to the principal cylinder to operate the valve of the principal cylinder, and so constructed and combined with the steam-passages of the auxiliary cylinder as to close the exhaust-ports of the auxiliary cylinder after the ports of the principal cylinder are opened, to admit steam to the said principal cylinder, by which closing of the exhaust-ports of the auxiliary cylinder the pistons of the auxiliary cylinder cushion upon steam at either end of the said auxiliary cylinder; secondly, in an arrangement of valves and passages in the cylinder of steam-engines for cushioning the piston and aiding in reversing its stroke.

To enable others skilled in the art to construct and operate my invention, I will proceed to fully describe the same, as illustrated in the accompanying drawings.

A is a steam-cylinder having piston P, slide-valve B, exhaust-passage C, and side passages, D and D′, all of ordinary construction, except that the passages D and D′ open into the cylinder at a less than the length of the piston from the cylinder-heads instead of at the extremities of the cylinder, as in ordinary steam-engines.

E and E′ are two auxiliary passages, opening into the cylinder at its extremities, for the purpose of conducting steam into the cylinder at certain periods of the stroke, steam entering the said passages E and E′ from the passages D D′ through the ports *e e*.

F is a rocker arm operated by a tappet, G, on the piston-rod R.

*a* is an auxiliary cylinder attached to and forming a steam-chest to the principal cylinder A.

*p p* are two pistons connected by a rod, *r*, and the said rod *r* attached to the valve B of the principal cylinder A.

*d d′* are steam-passages to the auxiliary cylinder, like the passages D D′ of the main cylinder, opening into the auxiliary cylinder at the same relative distance from the heads of the auxiliary cylinder.

*f f* are two passages, auxiliary to the passages *d d′*, opening into the auxiliary cylinder at its extremities, for the purpose of conducting steam into the auxiliary cylinder at certain periods of the stroke of the pistons *p p*, steam entering the said passages *f f′* through ports *i i′* in like manner as in the main cylinder.

C is the exhaust-passage for the auxiliary cylinder, which may or may not connect with the exhaust-passage C, as denoted in broken red lines.

B is the steam-chest of the auxiliary cylinder, within which is placed the slide-valve *b* in the usual manner. The two steam-chests *a* B′ may be connected, as denoted by the brok n red lines, so as to receive steam from one and the same pipe, or separate pipes may be employed to conduct the steam to each steam-chest.

T is the valve-rod, connecting with the rocker-arm F and the slide-valve *b* of the auxiliary cylinder.

The valves which close the ports *e e′ i i′* are constructed as follows, (shown enlarged in Fig. 2:) I is a cup-shaped valve, fitting the said ports, having a cap, J, pierced by a stem K, which is retained within the cup by a foot, L. The stem K is screw-threaded, so as to fit a corresponding thread below the stuffing-box M. The stem K, extending up through the said stuffing-box, terminates in a handle, O, by means of which the stem may be turned up or down, to govern the operation of the valve I, to hold the said valve permanently open, restrict its opening, or permanently close it, at the pleasure of the engineer. Steam, being admitted to the steam-chests, enters the steam-chest *a* and fills the space between the two pistons *p p* and holds them in equilibrium.

The tappet rocker arm F, slide-valve *b*, and piston P are arranged relatively to each other and to the steam and exhaust passages of the auxiliary cylinder so that the instant the main piston P has passed (for example) the side passage D at the (then) exhaust end of the cylinder the slide-valve *b* will be drawn back by the rocker-arm to the position indicated in Fig. 1, (the pistons *p p'* and valve B being at their extreme position, as denoted in red,) which will admit steam through the passage *d*, thence through the port and passage *f* to the cylinder before the piston *p*, forcing the connected pistons *p p* with the valve B quickly to the opposite end of the cylinder. The piston *p*, closing the exhaust-passage *d*, retains sufficient quantity of steam at that end of the cylinder to cushion against and prevent the piston from striking the cylinder-head. By this movement of the pistons *p p'*, carrying with them the valve B, opens the side passage, D, through which steam passes to the principal cylinder through the port *e* and passage E in front of the piston P, as denoted by arrows. The steam thus admitted forces the piston P to the other end of the cylinder until the (now) exhaust-passage D is closed by the piston P, as denoted in red. The steam then remaining in the cylinder between the piston and cylinder-head forms a cushion in like manner and for the same purpose as described for the pistons in the auxiliary cylinder. In the last part of the travel of the piston P the tappet G turns the rocker-arm to throw the small valve *b* to reverse the auxiliary piston to exhaust the steam from the auxiliary cylinder when the pistons *p p*, carrying with them the valve B, will return to the position denoted in red, cushioning at that end in like manner as before described, which movement of the valve B permits the steam within the principal cylinder to escape through the exhaust-passage C, and more steam to be admitted to the cylinder upon the opposite side of the piston P, causing the said piston P to return to the position denoted in Fig. 1, cushioning at that end of the cylinder in like manner as described at the other end of the cylinder, and so continuing to act. The auxiliary pistons operating the valve B, the piston P in the principal cylinder will continue to traverse from end to end of its cylinder, preventing the piston of the principal cylinder or the auxiliary pistons ever approaching nearer their respective cylinder-heads than permitted by the steam upon which they are cushioned. The cushion may aid in reversing the pistons, but such aid is not necessary to the successful working of my invention.

The rocker is so constructed that after the arm F has been sufficiently turned to open the valve *b* the tappet G will complete its movement with the piston P without further movement of the rocker. As the surfaces of the rocker above the tappet and the guide below are parallel, therefore by changing the form of the rocker or making it adjustable the valve *b* may be opened at any required point in the movement of the piston P, and so as to open more or less the ports of the auxiliary cylinder.

The principal aim of my invention is to avoid concussion in the cylinder, insure the prompt return of the piston, enabling it to pass its dead-points, and by no possibility to be stopped except by cutting off the steam entirely or accidental derangement of some of the parts, whereby it is made peculiarly applicable to all purposes where a simple reciprocating movement only is required.

Having therefore thus fully described my invention, what I claim as new and useful, and desire to secure by Letters Patent, is—

1. Imparting to the valve of the auxiliary cylinder a positive movement from the piston of the principal cylinder by means of the tappet G and rocker, F, for the purpose of admitting and exhausting steam to actuate the pistons of the auxiliary cylinder, when the said pistons are constructed of equal areas and arranged substantially as described, and the steam which actuates them received direct from the boiler for the purpose of operating the valve or valves of the principal cylinder, substantially as and for the purpose set forth herein.

2. The pistons P and P', constructed and arranged relatively to the passages *d d'* so as to operate in the manner and for the purpose substantially as specified.

3. The arrangement of the check-valve I I' and passages E E', in relation to the passages D and D' and the main valve, substantially as set forth.

EDWARD D. BARRETT.

Witnesses:
JOHN E. EARLE.
RUFUS SANFORD.